United States Patent
Irita et al.

(10) Patent No.: US 7,774,017 B2
(45) Date of Patent: Aug. 10, 2010

(54) SEMICONDUCTOR INTEGRATED CIRCUIT DEVICE

(75) Inventors: Takahiro Irita, Tokyo (JP); Kunihiko Nishiyama, Tokyo (JP); Saneaki Tamaki, Tokyo (JP); Takao Koike, Tokyo (JP); Koji Goto, Tokyo (JP); Masayuki Ito, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 173 days.

(21) Appl. No.: 11/586,671

(22) Filed: Oct. 26, 2006

(65) Prior Publication Data
US 2007/0098046 A1 May 3, 2007

(30) Foreign Application Priority Data
Oct. 28, 2005 (JP) .............................. 2005-314135

(51) Int. Cl.
*H04M 1/00* (2006.01)
(52) U.S. Cl. .................. 455/550.1; 455/556.1
(58) Field of Classification Search .............. 455/556.1, 455/550, 566, 108, 556.2; 348/14.02, 552; 345/541; 711/118; 712/32
See application file for complete search history.

(56) References Cited

U.S. PATENT DOCUMENTS

| 6,825,827 | B2 | 11/2004 | Miura | 345/98 |
|---|---|---|---|---|
| 6,868,263 | B2* | 3/2005 | Filipovic | 455/108 |
| 7,444,168 | B2 | 10/2008 | Nakagawa et al. | |
| 2003/0064747 | A1* | 4/2003 | Simmons et al. | 455/550 |
| 2003/0103056 | A1* | 6/2003 | Margulis | 345/542 |
| 2003/0120896 | A1* | 6/2003 | Gosior et al. | 712/32 |
| 2004/0044874 | A1* | 3/2004 | Leach et al. | 711/220 |
| 2005/0012811 | A1* | 1/2005 | Nakagawa et al. | 348/14.02 |
| 2007/0083712 | A1* | 4/2007 | Bradford et al. | 711/118 |
| 2009/0029735 | A1 | 1/2009 | Nakagwa et al. | |

FOREIGN PATENT DOCUMENTS

| JP | 2003-29957 | | 1/2003 |
|---|---|---|---|
| JP | 2003-283651 | A | 10/2003 |
| JP | 2005-136572 | A | 5/2005 |
| JP | 2005-151535 | A | 6/2005 |

* cited by examiner

*Primary Examiner*—George Eng
*Assistant Examiner*—Nizar Sivji
(74) *Attorney, Agent, or Firm*—Miles & Stockbridge P.C.

(57) ABSTRACT

A processing load of a high performance application processing such as a voice, an image and the like is reduced, and a processing capacity of a base band processing is improved. A semiconductor integrated circuit device used in a mobile communication system such as a cellular phone is provided with a base band CPU block performing a base band processing for executing a base band protocol stack, an application system CPU block executing a high-level OS and controlling applications other than the base band processing, an application real-time CPU block executing a real-time OS and the like and controlling an image/voice processing, all of which are formed on one semiconductor chip. Further, internal high-speed buses to which these CPU blocks are connected are respectively connected via bridges.

9 Claims, 4 Drawing Sheets

SEMICONDUCTOR INTEGRATED CIRCUIT DEVICE

CROSS-REFERENCE TO RELATED APPLICATION

The present application claims priority from Japanese patent application No. JP 2005-314135 filed on Oct. 28, 2005, the content of which is hereby incorporated by reference into this application.

BACKGROUND OF THE INVENTION

The present invention relates to an application processing technique of a semiconductor integrated circuit device and, more particularly, to a technique effectively applicable to making high efficient a voice and an image processings in a semiconductor integrated circuit device mounted on a wireless communication system such as a cellular phone.

In recent years, in the cellular phone, there is generally executed a high performance application such as a camera, a television telephone, a JAVA game or the like, in addition to a voice communication and an electronic mail.

In this kind of cellular phone, for example on a market for a wideband code division multiple access (WCDMA), there have been widely known the cellular phone in which a high-level operating system (OS) is required and on which an application processor is mounted, because a high performance application is activated early and a software structure is complicated.

In this case, since the high-level OS is executed in the application processor, it becomes weak to execute the application requiring a real-time response such as an image, a voice or the like. Accordingly, there is an example in which an accelerator processor is independently mounted so as to compensate for a deficiency in a processing capacity.

Further, on a market for global system for mobile communications (GSM)/general packet radio service (GPRS), the high performance application has not been desired thus far. For this reason, there has been widely known a structure in which a base band processor is made high performance and the application is executed by utilizing a surplus time of a base band protocol stack processing.

In this case, it is desired that a processor for achieving respective processings of a WCDMA protocol capable of achieving a high performance wireless service and a widely utilized GSM protocol is mounted on the base band processor, and there has been known a structure in which processors for executing these two base band processings are independently mounted.

SUMMARY OF THE INVENTION

However, in the application processing technique in the cellular phone as mentioned above, the inventors of the present invention have found that the following problems arise.

In other words, in the application processing using the application processor, it is necessary to execute a real-time interruption reply between respective exclusive accelerator circuits in the real-time processing of the image, the voice and the like. Accordingly, there is a problem such that it is hard to develop software in the high-level OS.

Further, in the case that the accelerator processor is independently mounted in addition to the application processor, it is necessary to give and receive a large amount of data such as an image data or the like. Therefore, the independently mounted processor is used for securing a band of the data and transferring the data, whereby there is a problem as regarded as a disadvantage in terms of power consumption.

Further, in an example in which two processors for WCDMA/GSM are mounted, it becomes easy to design the respective processors in the case where a used mode is fixed. However, there is a problem such that it is hard to design a protocol stack simultaneously supporting both protocols.

Further, in the application processing by the base band processor, the base band processor mainly executes the protocol stack processing. However, since this processing is constituted essentially by the real-time process, it must be mounted under the real-time OS. Accordingly, there is a problem such that an affinity with the high-level OS is low and it is hard to create the high performance application.

Further, in order to improve the processing capacity of the base band processor, manufacturing the base band processor is necessary by using a transistor operating at a high speed and a leak current of the transistor becomes large accordingly. Since it is necessary to always operate the base band processor for awaiting a calling, the leak current by the transistor executing the high-speed operation falls within an unallowable range.

An object of the present invention is to provide a technique which can drastically reduce a processing load of a high performance application processing such as a voice, an image and the like and can significantly improve a processing capacity of a base band processing.

The above and other objects and novel features of the present invention will be apparent from the description of the present specification and the accompanying drawings.

Outlines of representative ones of the inventions disclosed as the present application will be briefly described as follows.

The present invention is a semiconductor integrated circuit device used in a mobile communication system, the device comprising: a base band processing unit for controlling a wireless communication base band processing; a first system processing unit for controlling the mobile communication system except the base band processing; and a second system processing unit for controlling image and voice processings, wherein the base band processing unit, the first system processing unit, and the second system processing unit are provided on one semiconductor chip.

Also, outlines of other inventions of the present application will be briefly described.

The present invention is such that the base band processing unit executes base band processings in a GSM method and a WCDMA method.

Also, the present invention further comprises a bus bridge for connecting a first bus to which the first system processing unit is connected and a second bus to which the second system processing unit is connected, wherein the first system processing unit and the second system processing unit can be communicated with each other by the bus bridge, and the first system processing unit and the second system processing unit have a common memory address space.

Further, the present invention is such that the base band processing unit has an independent memory address space other than the memory address space held in common by the first system processing unit and the second system processing unit.

Also, the present invention is such that the memory address space held by the base band processing unit is provided with an access window capable of accessing to an arbitrary memory address space held in common by the first system processing unit and the second system processing unit, and the memory address space held in common by the first system processing unit and the second system processing unit is provided with an access window capable of accessing to an arbitrary memory address space held by the base band processing unit.

Further, the present invention further comprises: a first interface connected between an interruption controller for executing interruption control of the base band processing unit and an interruption controller for executing interruption control of the first system processing unit; and a second interface connected between the interruption controller for executing the interruption control of the first system processing unit and an interruption controller for executing interruption control of the second system processing unit, wherein an interruption request to each other via the first interface is made in the base band processing unit and the first system processing unit, and an interruption request to each other via the second interface is made in the first system processing unit and the second system processing unit.

Effects of representative ones of the inventions disclosed in the present application will be briefly described as follows.

(1) It is possible to dramatically reduce the processing load caused by the application processing such as a voice, a image and the like.

(2) It is also possible to significantly improve the processing capacity of the base band processing.

(3) In accordance with items (1) and (2) mentioned above, it is possible to enhance performance while improving reliability of the semiconductor integrated circuit device.

DESCRIPTION OF THE PREFERRED EMBODIMENTS

Hereinafter, an embodiment of the present invention will be detailed with reference to the accompanying drawings. Note that, throughout all the drawings for explaining the embodiment, the same reference numerals are denoted in principle by the same members and the repetitive description thereof will be omitted.

Figure 1:
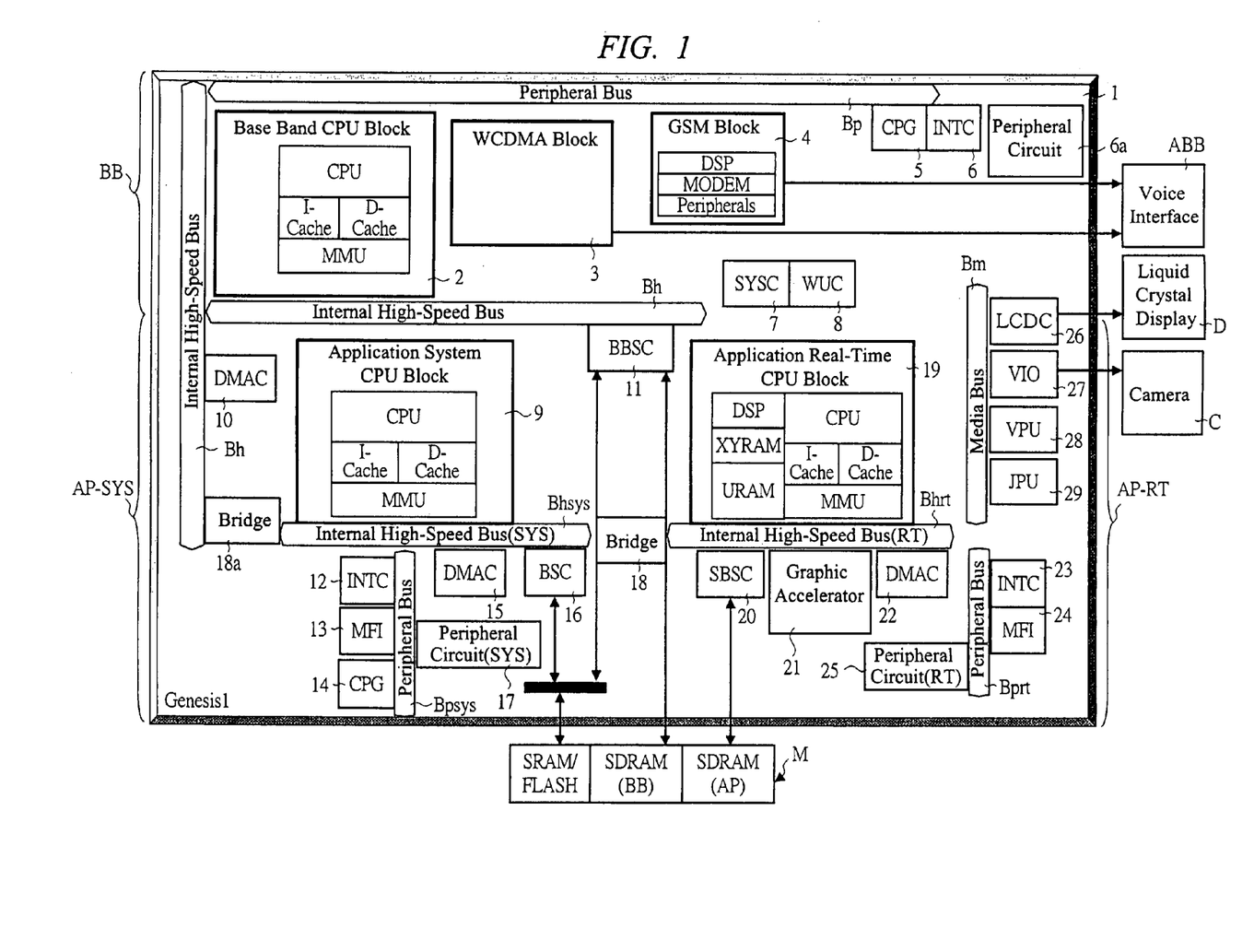
FIG. 1 is a block diagram showing a structure of a semiconductor integrated circuit device in accordance with an embodiment of the present invention.
Figure 2:
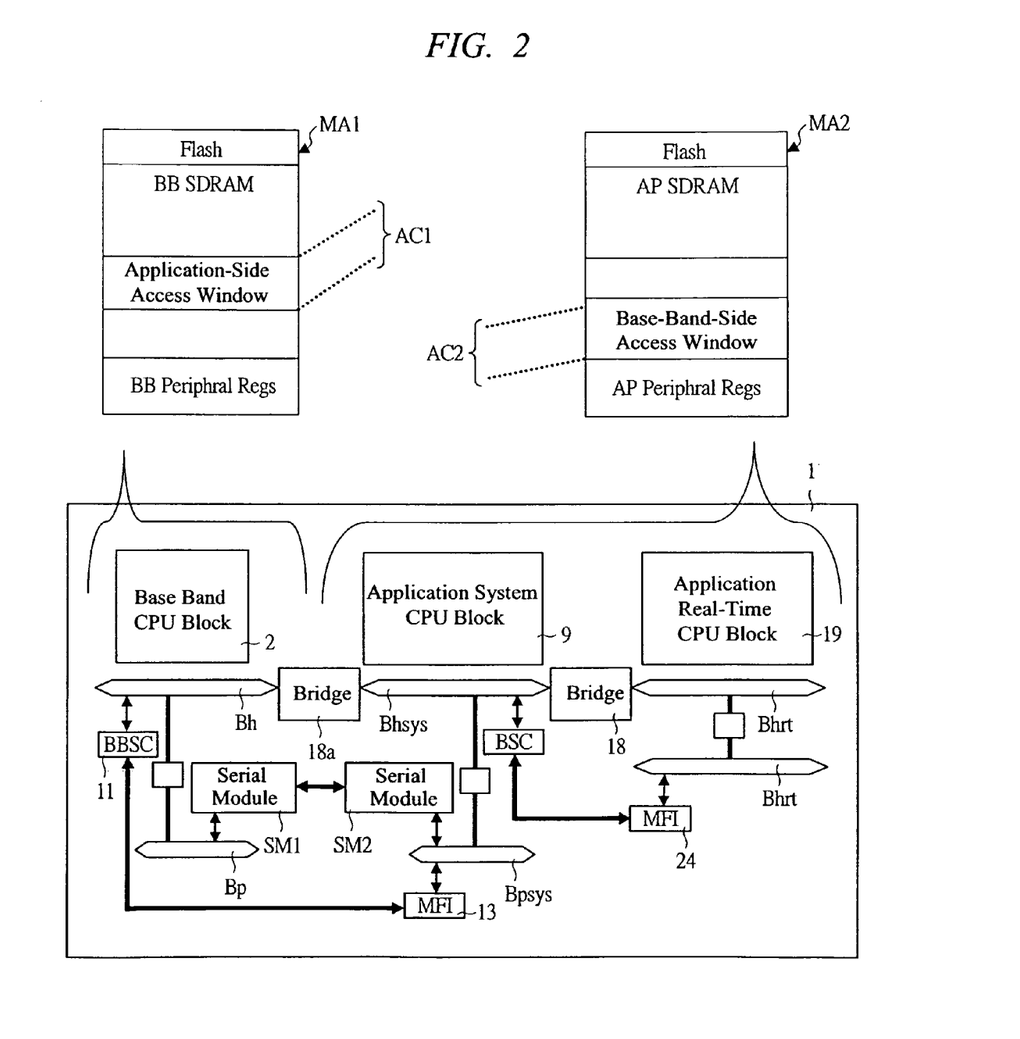
FIG. 2 is an explanatory view schematically showing a relation among communication connections in respective CPU blocks of the semiconductor integrated circuit device in FIG. 1 and showing a structure of a memory space.
Figure 3:
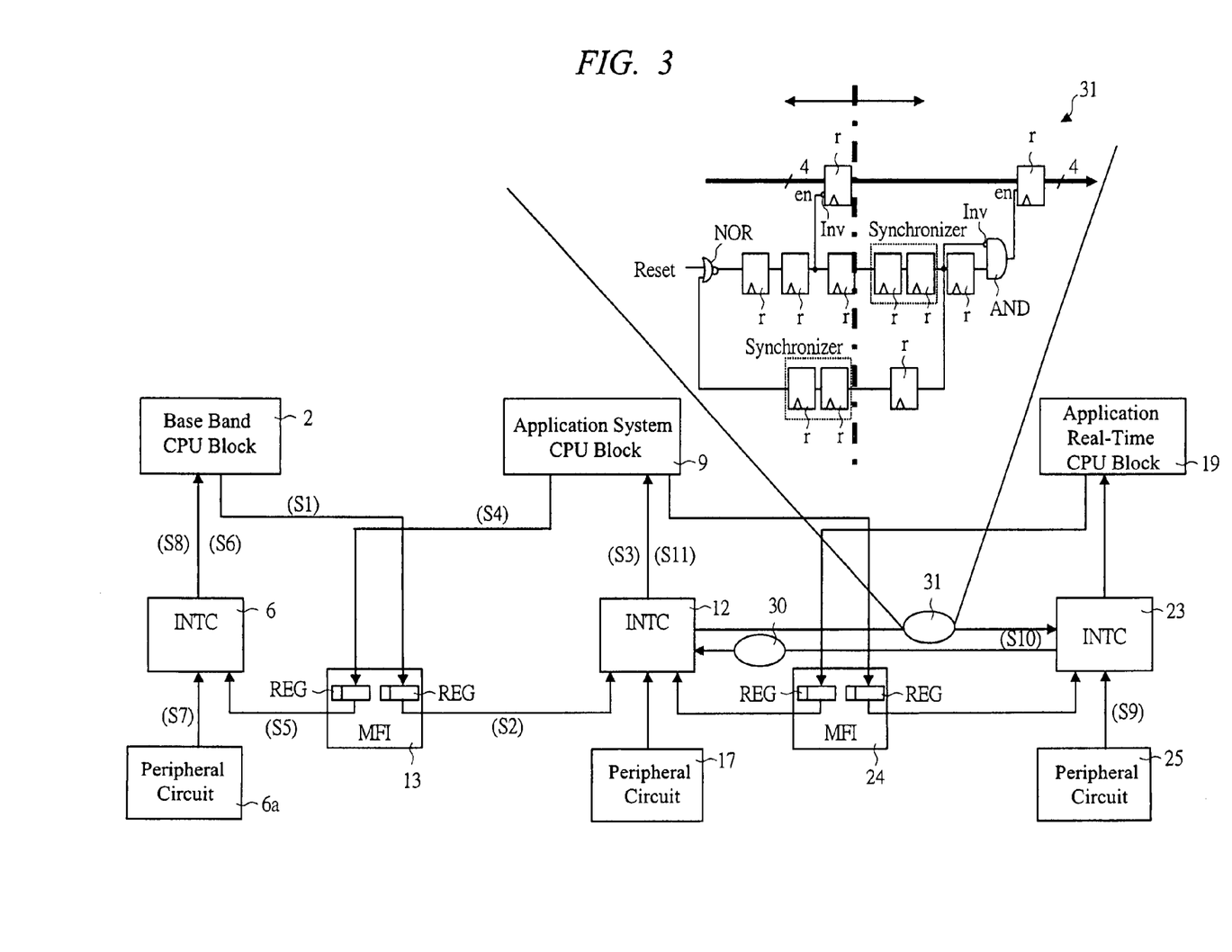
FIG. 3 is an explanatory view schematically showing an interruption processing by the semiconductor integrated circuit device in FIG. 1.
Figure 4:
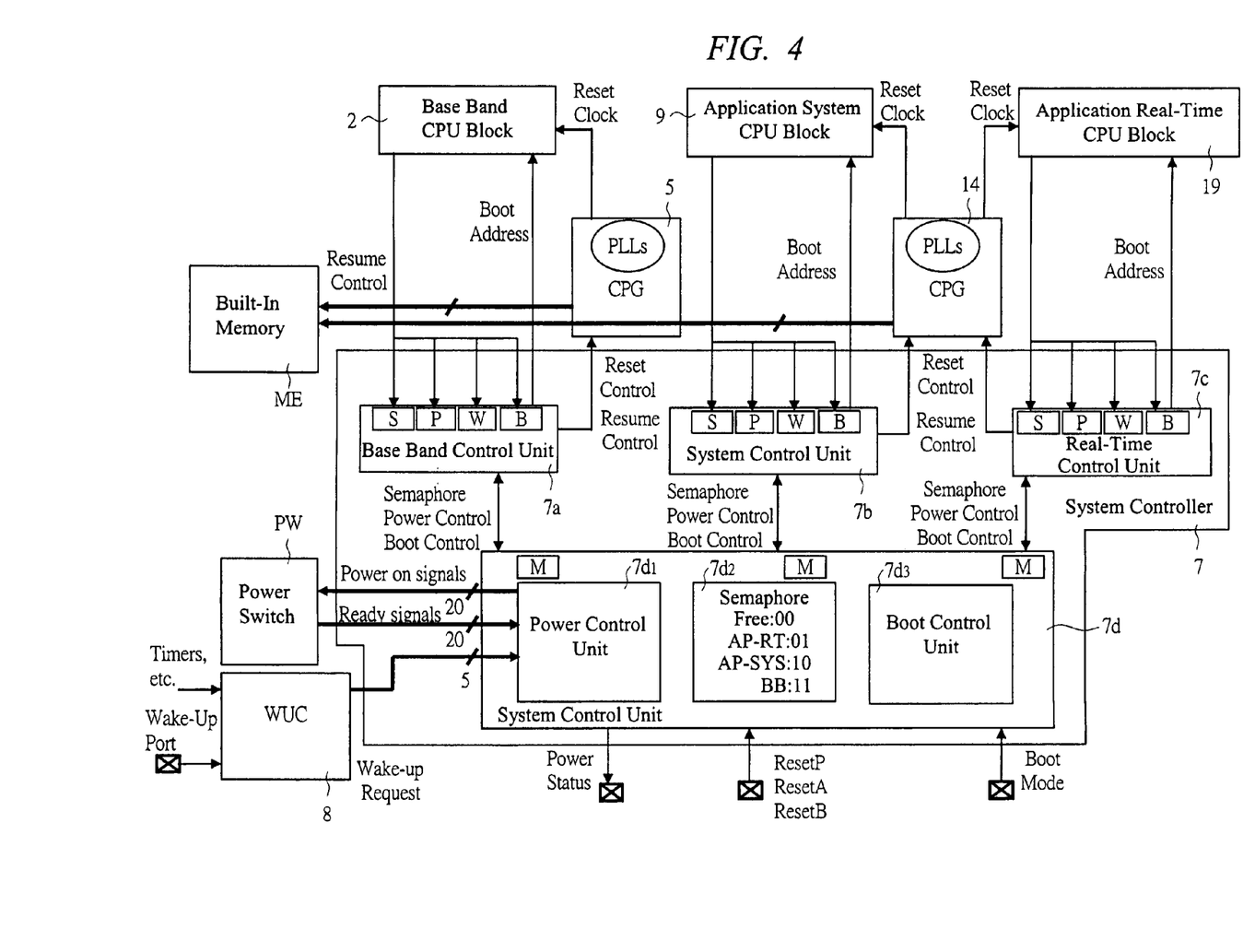
FIG. 4 is an explanatory view schematically showing a control operation of power supply in a power source region by a system controller provided in the semiconductor integrated circuit device in FIG. 1.

FIG. 1 is a block diagram showing a structure of a semiconductor integrated circuit device in accordance with an embodiment of the present invention; FIG. 2 is an explanatory view schematically showing a relation among communication connections of respective CPU blocks of the semiconductor integrated circuit device in FIG. 1 and showing a structure of a memory space; FIG. 3 is an explanatory view schematically showing an interruption processing by the semiconductor integrated circuit device in FIG. 1; and FIG. 4 is an explanatory view schematically showing a control operation of power supply in a power source region by a system controller provided in the semiconductor integrated circuit device in FIG. 1.

In the present embodiment, a semiconductor integrated circuit device 1 is used in, for example, a mobile communication system such as a cellular phone or the like. The semiconductor integrated circuit device 1 includes, as shown in FIG. 1, a base band unit BB, an application system unit AP-SYS, an application real-time unit AP-RT, a system controller (SYSC) 7, and a wake-up controller (WUC) 8, all of which are formed on one semiconductor chip.

The base band unit BB is constituted by a base band CPU block 2 serving as a base band processing unit, a WCDMA block 3, a GSM block 4, a clock pulse generator (CPG) 5, an interruption controller (INTC) 6, and a peripheral circuit 6a.

The application system unit AP-SYS is constituted by an application system CPU block 9 serving as a first system processing unit, a direct memory access controller (DMAC) 10, a base band bus controller (BBSC) 11, an interruption controller (INTC) 12, a multi functional interface (MFI) 13, a clock pulse generator (CPG) 14, a DMAC 15, a memory controller (BSC) 16, a peripheral circuit 17, and bridges 18 and 18a serving as bus bridges.

The application real-time unit AP-RT is constituted by an application real-time CPU block 19 serving as a second system processing unit, a memory controller (SBSC) 20, a graphic accelerator 21, a DMAC 22, an interruption controller (INTC) 23, an MFI 24 serving as a second interface, a peripheral circuit 25, an LCD controller (LCDC) 26, a VIO 27, a video processing unit (VPU) 28, and a JPEG codec unit (JPU) 29.

The base band CPU block 2 executes a real-time OS and executes a base band protocol stack. The WCDMA block 3 is a block for executing a communication processing in the WCDMA, and is provided with a digital signal processor (DSP), a modem and the other peripheral circuits.

The GSM block 4 is a block for executing the communication processing in the GSM, and is provided with the DSP, the modem and the other peripheral circuits in the same manner. A signal processed by the WCDMA block 3 or the GSM block is connected in such a manner as to be outputted to a wireless and voice interface circuit ABB connected to an external portion. The wireless and voice interface circuit ABB forms a WCDMA wireless circuit, a GSM wireless circuit and an interface for a speaker, a microphone or the like.

The clock pulse generator 5 generates a clock signal, and supplies the clock signal to each of the blocks in the base band unit BB. The interruption controller 6 executes a control of an interruption process of each of the blocks in the base band unit BB.

The system controller 7 is a controller for generally managing the semiconductor integrated circuit device 1, and controls an ON/OFF state of supplying power to a power source region. In this case, arbitrarily divided regions in each of which supply/shutoff of power is executed are set in each of the CPU blocks, and a unit for each region is called the power source region. The wakeup controller 8 detects an external interruption signal or an interruption signal outputted from an internal module, and requests a power source return of the corresponding power source region shut off by the system controller 7.

The application system CPU block 9 executes a high-level OS, and executes an application control. The DMAC 10 executes a date transfer processing in the externally connected semiconductor memory unit M, the peripheral module of the base band unit BB, and a built-in memory.

The externally connected semiconductor memory unit M is constituted by, for example, a nonvolatile semiconductor memory exemplified by a flash memory, a static random access memory (SRAM), and a synchronous dynamic RAM (SDRAM).

The base band bus controller 11 executes a control of the externally connected semiconductor memory unit M. The interruption controller 12 executes interruption control of the application system CPU block 9. An MF 113 is used as a communication interface between the base band CPU 2 and the application system CPU block 9.

The clock pulse generator 14 generates a clock signal, and supplies the clock signal to each of the blocks in the application system unit AP-SYS. The DMAC 15 and the DMAC 10 execute data transfer processings of the externally connected semiconductor memory unit M, the peripheral module in the application system unit AP-SYS, the semiconductor memory unit M or the like.

The memory controller 16 is a memory controller for the externally connected semiconductor memory unit M (the flash memory for the application system unit AP-SYS). The peripheral circuit 17 is constituted by functional modules of the various peripheral circuits belonging to the application system unit AP-SYS.

The bridge 18 connects an internal high-speed bus (a first bus) Bhsys to which the application system CPU block 9 is connected, and an internal high-speed bus (a second bus) Bhrt to which the application real-time processor 19 is connected.

The bridge 18*a* connects an internal high-speed bus Bh to which the base band CPU block 2 is connected, and the internal high-speed bus Bhsys to which the application system CPU block 9 is connected.

The application real-time CPU block 19 executes the real-time OS or the like, and controls the accelerator circuit for processing the image or the voice. The memory controller 20 corresponds to a memory controller of the externally connected semiconductor memory unit M (for example, the SDRAM for the application real-time unit AP-RT). The graphic accelerator 21 executes a three-dimensional graphic processing or the like.

The DMAC 22 executes the data transfer processings in the externally connected semiconductor memory unit M, the peripheral module of the application real-time unit AP-RT, the built-in memory or the like. The interruption controller 23 executes the interruption control of the application real-time CPU block 19.

The MFI 24 is used as a communication interface between the application system CPU block 9 and the application real-time CPU block 19. The peripheral circuit 25 is constituted by functional modules of various peripheral circuits belonging to the application real-time unit AP-RT.

The LCD controller 26 executes display control of an externally connected liquid crystal display D. The VIO 27 processes any image taken therein from an externally connected camera C. The VPU 28 is an accelerator for a moving picture processing such as a moving picture experts group phase 4 (MPEG-4) or the like. The JPU 29 executes a data compression processing of a static image such as a joint photographic experts group (JPEG) or the like.

The base band CPU block 2, the DMAC 10 and the base band bus controller 11 are connected to each other via the internal high-speed bus Bh. Further, the peripheral circuit 6*a* constituted by the clock pulse generator (CPG) 5, the interruption controller (INTC) 6, and any other plural peripheral modules is connected via the peripheral bus Bp.

The application system CPU block 9, the DMAC 15 and the memory controller 16 are connected to each other via the internal high-speed bus Bhsys.

The application real-time CPU block 19, the memory controller 20, the graphic accelerator 21, and the DMAC 22 are connected to each other via the internal high-speed bus Bhrt.

Further, the application system CPU block 9 and the application real-time CPU block 19 are connected to each other via the bridge 18 connecting the internal high-speed bus Bhsys and the internal high-speed bus Bhrt.

As mentioned above, since the application system CPU block 9 and the application real-time CPU block 19 are separated by the bridge 18, it is possible to execute the interruption processing generated in a real time and frequently by the application real-time CPU block 19 and to reduce a burden of the application on the high-level OS executed in the application CPU block 2.

Further, the base band CPU block 2 and the application system CPU block 9 are connected to each other via the bridge 18*a* connecting the internal high-speed bus Bhsys and the internal high-speed bus B.

As mentioned above, since the application system CPU block 9 is separated from the base band CPU block 2 via the bridge 18*a*, it is possible to exclusively use the base band CPU block 2 for the protocol stack.

Further, since it is possible to separate the application system CPU block 9 and the application real-time CPU block 19 by the bridge 18 and separate the base band CPU block 2 and the application system CPU block 9 by the bridge 18*a*, respectively, it is possible to individually shut off the power source in each of the processor regions by the system controller 7.

For this reason, the application system CPU block 9 and the application real-time CPU block 19 are permitted to be manufactured by using the high-speed high-leak type transistor, and an improvement of a processing capacity in the application processing can be achieved.

Further, the base band CPU block 2 necessary to be always operated is exclusively used as the protocol stack to suppress necessary performance, and is manufactured by using a low-speed low-leak type transistor, thereby making it possible to achieve low power consumption and to extend an awaiting time of the cellular phone.

The interruption controller 12, the MFI 13, the clock pulse generator 14 and the peripheral circuit 17 are connected to each other via the peripheral bus Bpsys. The LCD controller 26, the VIO 27, the VPU 28 and the JPU 29 are connected to each other via the media bus Bn. Further, the interruption controller 23, the MFI 24 and the peripheral circuit 25 are connected to each other via the peripheral bus Bprt.

An off chip bus of the memory controller 16, and an off chip bus of the externally connected semiconductor memory unit M controlled by the memory controller 16 are used in common, and have an arbitrating circuit automatically adjusting the bus cycle.

FIG. 2 is an explanatory view schematically showing a relation among communication connections in the base band CPU block 2 of the semiconductor integrated circuit device 1, the application system CPU block 9, and the application real-time CPU block 19 and showing a structure of a memory space.

First, in a lower side of FIG. 2, the base band CPU block 2 and the application system CPU block 9 are communicated via a serial module SM1 and a serial module SM2.

The serial modules SM1 and SM2 are modules for sending/receiving the serial communication. The serial module SM1 is provided in the peripheral circuit 6*a* of the base band unit BB, and the serial module SM2 is provided in the peripheral circuit 17. Further, the serial module SM1 is connected to the peripheral bus Bp, and the serial module SM2 is connected to the peripheral bus Bpsys.

The base band CPU block 2 and the application system CPU block 9 can be communicated by accessing to the MFI 13 from the base band bus controller 11.

In the same manner, the application system CPU block 9 and the application real-time processor 19 are communicated via the memory controller 16 and the MFI 24.

It is possible to give and receive the serial data by the serial modules SM1 and SM2, and to give and receive the packet data by the MFI 13 and 24. Further, it is possible to stably give and receive the data by the MFIs 13 and 24 regardless of a congestion degree of the internal high-speed buses Bhsys and Bhrt.

Subsequently, in an upper side of FIG. 2, a left side shows a structure of a memory space map in the base band CPU block 2, and a right side shows a structure of a memory address space map in the application system CPU block 9 and the application real-time processor 19.

As illustrated, the base band CPU block 2 has an independent memory address space map MA1, and its structure is such that the application system CPU block 9 and the application real-time processor 19 have the memory address space map MA2 in common.

It is possible to make the semiconductor memory unit M, the peripheral circuits 17 and 25 and the like access also to any CPU block of the application system CPU block 9 and the application real-time CPU block 19, by having the memory address space map MA2 in common.

For example, it is possible to make it unnecessary to transmit the data between both the CPU blocks, by arranging the large amount of data such as a image, a voice or the like in the memory space common to the application system CPU block 9 and the application real-time CPU block 19.

Further, the peripheral circuits 17 and 25 can be operated even by any CPU block, and the interruption can be received even by any CPU block. Therefore, when it is determined that an activation of the real-time processing is necessary by supplying the power source only to the application system CPU block 9 and monitoring a state of the peripheral circuit 25, the power source can be supplied to the application real-time CPU block 19.

Further, since both CPU blocks can also monitor the interruption, flow control such as a processing start, a processing finish, a processing error or the like can be handled by the application system CPU block 9 and data control such as a data transfer, a data processing or the like can be handled by the application real-time CPU block 19.

Further, a part of the memory address space map MA1 has an application-side access window AC1 capable of reading the memory address space of the memory address space map MA2. In the same manner, a part of the memory address space map MA2 has a base-band-side access window AC2 capable of reading the memory address space of the memory address space map MA1.

For example, in the case of accessing to the application-side access window AC1 of the memory address space map MA1, it is possible to access to an arbitrary address space of the previously set memory address space map MA2 and the base band CPU block 2 can access to the semiconductor memory unit M, the peripheral circuits 17 and 25 and the like.

Address ranges of the application-side access window AC1, and the base band side access window AC2 are set by, for example, storing an arbitrary register value in a register provided in the bridge 18a.

FIG. 3 is an explanatory view schematically showing interruption processings of the base band CPU block 2, the application system CPU block 9 and the application real-time CPU block 19 in the semiconductor integrated circuit device 1.

A description will be first made of the case that the base band CPU block 2 performs interruption processings (S1 to S3) to the application system CPU block 9.

First, the base band CPU block 2 executes an access to the MFI 13 serving as a first interface (S1) and sets, to an interruption generating register REG provided in the MFI 13, a register value by which the interruption processing is performed. The MFI 13 set to the interruption generating register REG outputs an inter-CPU communication interruption request signal to the interruption controller 12 (S2).

By receiving the inter-CPU communication interruption request signal, the interruption controller 12 outputs an interruption request signal to the application system CPU block 9 (S3).

Further, in the case where the application system CPU block 9 performs interruption processings (S4 to S6) to the base band CPU block 2, the application system CPU block 9 executes an access to the MFI 13 (S4) and sets, to the interruption generating register REG provided in the MFI 13, a register value by which the interruption processing is performed.

By doing so, the MFI 13 outputs the inter-CPU communication interruption request signal to the interruption controller 6 (S5). Then, the interruption controller 6 receives the inter-CPU communication interruption request signal and outputs an interruption request signal to the base band CPU block 2 (S6).

The MFIs 13 and 24 are each provided with a common register and a common memory, and can give and receive data representing an interruption factor and a message in addition to the interruption request signal as mentioned above.

In the case where an interruption processing (S7 and S8) is performed to the base band CPU block 2 from the peripheral circuit 6a, an individual interruption request signal requesting the interruption to the base band CPU block 2 is outputted to the interruption controller 6 from the peripheral circuit 6a (S7).

The interruption controller 6 receives the interruption request signal from the peripheral circuit 6a and outputs the interruption request signal to the base band CPU block 2 (S8).

Next, a description will be made of the case where the peripheral circuit 25 performs an interruption processing (S9 to S11) to the application system CPU block 9.

First, an individual interruption request signal requesting an interruption is outputted to the interruption controller 23 from the peripheral circuit 25 (S9). In this case, a plurality of wirings individually connected from a plurality of modules provided in the peripheral circuit 25 are connected to the interruption controller 23.

Further, an interruption level value of the individual interruption request signal outputted from each of the modules is inputted to the interruption controller 23 via the wirings.

For example, if an interruption request signal with an interruption level value "5" and an interruption request signal with an interruption level value "8" are respectively outputted from two modules of the peripheral circuit 25, the interruption controller 23 outputs only the signal having the higher interruption level value (the interruption level value "8" to the controller 12 (S10).

Interruption signal asynchronous transmission logic circuits 30 and 31 are connected between the interruption controller 23 and the interruption controller 12 respectively by one wiring.

The interruption signal asynchronous transmission logic circuits 30 and 31 are circuits for asynchronously transferring the interruption request signals from the interruption controller 23 to the interruption controller 12 (or from the interruption controller 12 to the interruption controller 23) when the application system CPU block 9 and the application real-time CPU block 19 are different in frequency of the operation clock signal. The interruption signal asynchronous transmission logic circuit 31 (, 30) is constituted by a latch r, a negative OR circuit NOR, an AND circuit AND, and an inverter Inv, as shown in an upper side of FIG. 3.

In this case, the interruption signal asynchronous transmission logic circuits 30 and 31 are respectively divided so as to be provided in the interruption controllers 12 and 23. For example, in the interruption signal asynchronous transmission logic circuit 31 in the upper side of FIG. 3, circuits in a left side of dotted lines in FIG. 3 are provided in the interruption controller 12, and circuits in a right side of the dotted line thereof are provided in the interruption controller 24.

Further, the interruption controller 12 receive the interruption request signal inputted via the interruption signal asynchronous transmission logic circuit 30, and outputs the interruption request signal to the application system CPU block 9 (S11).

Thus, since a communication path is provided between the interruption controllers 12 and 23 by connecting the interruption signal asynchronous transmission logic circuits 30 and 31, factors of the peripheral circuit belonging to one of the CPU blocks (for example, the application real-time CPU block 19) can be transmitted to the other of the CPU blocks (for example, the application system CPU block 9).

Accordingly, both the CPU blocks 9 and 19 can monitor the interruption while dividing a hardware resource, such as the setting of the interruption level value in the interruption request signal, into the interruption controllers 12 and 23.

FIG. 4 is an explanatory view schematically showing a control operation of power supply in a power source region set per block by the system controller 7.

As illustrated, the system controller 7 is constituted by a base band control unit 7a, a system control unit 7b, a real-time control unit 7c and a system control unit 7d. The base band control unit 7a executes control corresponding to the base band CPU block 2.

The system control unit 7b executes control corresponding to the application system CPU block 9, and the real-time control unit 7c executes control corresponding to the application real time CPU block 19. The system control unit 7d generally controls the base band control unit 7a, the system control unit 7b and the real-time control unit 7c.

Each of the base band control unit 7a, the system control unit 7b and the real-time control unit 7c is provided with four registers each comprising a semaphore register S, a power-down register P, a wake-up register W and a boot control register B.

The semaphore register S is a register set at a time of accessing to a semaphore $7d_2$ as mentioned below. The power-down register P is a register for requesting power shutoff to the power source region. The wake-up register W is a register for requesting power supply to the power source region in which the power is shut off. The boot control register B is a register for setting a boot operation at a time of starting.

The system control unit 7d is provided with a power control unit $7d_1$, a semaphore $7d_2$, a boot control unit $7d_3$, and three mask registers M. The power control unit $7d_1$ controls a power switch PW. The power switch PW is connected to each of the power source regions, and supplies and shuts off the power with respect to arbitrary power source region on the basis of the control of the power control unit $7d_1$.

For example, when the register value is set in the power-down register P, the power switch PW is set in such a manner as to shut off the power with respect to the power source region of the CPU block corresponding to the power-down register P.

The semaphore $7d_2$ reads the register value set in each of the semaphore registers S, and executes such control that a control right of supplying the power is given to any one of the CPU blocks 2, 9 and 19. For example, if the control right is given to the base band CPU block 2, "01" is set to the semaphore $7d_2$. In the same manner, in the case of the application system CPU block 9, "10" is set to the semaphore $7d_2$, and in the case of the application real-time CPU block 19, "11" is set to the semaphore $7d_2$. In the case where the control right of supplying the power is not set, "00" is set.

The boot control unit $7d_3$ controls each of the boot operations in three CPU blocks at a time of starting, on the basis of a boot mode signal inputted from an external terminal and of the resister value set in each of the boot control registers B. The mask register M carrying out masking of the register values set in the semaphore register S, the power-down register P, the wake-up register W, and the boot control register B, thereby canceling the setting.

The three CPU blocks 2, 9 and 19 access to the power down register P and the wake-up register W which is provided in each of the base band control unit 7a, the system control unit 7b and the real-time control unit 7c, and can execute the power source control in all the power source regions set in the semiconductor integrated circuit device 1.

The CPU block to become a master processor is determined on the basis of a boot mode signal inputted via the external terminal mentioned above. The CPU block serving as the master processor can set the mask registers M corresponding other two CPU blocks and serving as slave processors, and sets the controllable power source region of each of the slave processors.

Each of the boot control registers B in three CPU blocks can be accessed from the CPU blocks themselves or from the master processor, and can designate a boot address of each of the CPU blocks.

The system control unit 7d supplies a clock only to the master processor after releasing its reset, and stops a clock of the slave processor. Further, it starts supplying the clock to the slave processor by setting the register of the master processor.

Also, if the CPGs 5 and 14 receive resume control signals respectively outputted from the base band control unit 7a, the system control unit 7b and the real-time control unit 7c, they execute so-called resume control in which voltage supplied to a built-in memory ME (for example, SRAM) provided in the semiconductor integrated circuit device 1 is lowered to voltage necessary only for holding the data.

The wake-up controller 8 is connected in such a manner that the interruption signal outputted from the external interruption terminal, the module or the like is inputted. If the wake-up controller 8 detects the interruption signal, it outputs the result of detection to the power control unit $7d_1$.

The power control unit $7d_1$ restores the power supply in the arbitrary power source region on the basis of the inputted result of detection.

Therefore, in accordance with the present embodiment, since it is possible to efficiently execute the base band processing while significantly reducing the burden of the application processing, the performance of the semiconductor integrated circuit device 1 can be significantly improved.

As described above, the invention made by the present inventors has been specifically described on the basis of the embodiment. However, the present invention is not limited to the embodiment mentioned above and, needless to say, can be modified within the scope of not departing from the gist thereof.

The present invention can be applied to the semiconductor integrated circuit device for executing the application processing and the base band processing used for the mobile communication system.

What is claimed is:

1. A single-chip semiconductor integrated circuit device adapted for use in a mobile communication system, the device comprising:
   a base band processing unit adapted to process a wireless communication base band;
   a first system processing unit adapted to process an application control process, and having a first CPU and a peripheral circuit, the first system processing unit executing a first operating system for high-level processes; and
   a second system processing unit adapted to process image data and voice data, and having a second CPU and executing a second operating system for real-time processes;
   wherein the base band processing unit has a third CPU executing a third operating system for real-time processes,
   wherein the first system processing unit has a first memory address space,
   wherein the base band processing unit has a second memory address space which is different from the first memory address space,
   wherein the first memory address space for the first system processing unit has a first access window for accessing the second memory address space,
   wherein the second memory address space for the base band processing unit has a second access window for accessing the first memory address space,
   wherein the first CPU of the first system processing unit is adapted to access an arbitrary address space of the second memory address space by accessing the first access window of the first memory address space,
   wherein the base band processing unit is adapted to access the peripheral circuit of the first system processing unit by accessing the second access window of the second memory address space, and
   wherein the base band processing unit executes base band processing in a global system for mobile communication protocol and a wideband code division multiple access protocol.

2. The single-chip semiconductor integrated circuit device according to claim 1 further comprising:
   a register to store an arbitrary value indicating address ranges of the first access window,
   wherein the first operating system is different from the second operating system.

3. The single-chip semiconductor integrated circuit device according to claim 2, further comprising:
   a first bus connected to the first system processing unit;
   a second bus connected to the second system processing unit;
   a third bus connected to the base band processing unit; and
   a bus bridge connected to the first bus and the third bus,
   wherein the first system processing unit is separated from the base band processing unit via the bus bridge,
   wherein the first system processing unit includes a first MMU and a first cache memory,
   wherein the second system processing unit includes a second MMU and a second cache memory, and
   wherein the base band processing unit includes a third MMU and a third cache memory.

4. The single-chip semiconductor integrated circuit device according to claim 3,
   wherein the first operating system is a high-level operating system, and
   wherein the second operating system and third operating system are real-time operating systems.

5. A semiconductor integrated circuit device formed on one semiconductor chip and adapted for use in a cellular phone, the semiconductor integrated circuit device comprising:
   a base band unit including:
      a base band CPU section adapted to execute an operating system and executing a base band protocol stack,
      a WCDMA section executing a communication process in a wideband code division multiple access protocol, and
      a GSM section executing a communication process in a global system for mobile communication protocol;
   an application system unit including:
      an application system CPU section adapted to execute a first operating system which is a high-level operating system and executing an application control process;
      peripheral circuits; and
      a memory space having a first access window;
   an application real-time unit including:
      an application real-time CPU section adapted to execute a second operating system which is a real-time operating system and control an accelerator circuit for processing image data or voice data;
      a memory space of the application system unit being a common memory space with the application real time unit; and
      a memory space of the base band unit adapted to be independent of the memory space of the application system unit and having a second access window to access the memory space of the application system unit,
   wherein the base band CPU is adapted to access the peripheral circuits of the application system unit by accessing the second access window of the memory space of the base band unit, and
   wherein the operating system of the base band unit is a third operating system which is a real-time operating system.

6. A semiconductor integrated circuit device according to claim 5, further comprising:
   a first bus coupled to the base band CPU section;
   a second bus coupled to the application system CPU section;
   a third bus coupled to the application real-time CPU section;
   a first bus bridge coupled between the first bus and the second bus; and
   a second bus bridge coupled between the second bus and the third bus.

7. A semiconductor integrated circuit device according to claim 6, further comprising:
   a first cache memory and a first MMU for the base band CPU included in the base band unit;
   a second cache memory and a second MMU for the application system CPU section included in the application system unit; and a third cache memory and a third MMU for the application real-time CPU section included in the application real time unit.

8. A one chip semiconductor integrated circuit device adapted for use in a cellular phone, the one chip semiconductor integrated circuit device comprising:
 a base band processing unit including:
  a first CPU adapted to execute a first real-time operating system and executing a base band protocol stack for a wideband code division multiple access protocol and a global system for mobile communication protocol;
 an application processing unit including:
  a second CPU adapted to execute a high level operating system and executing application control; and
  a third CPU adapted to execute a second real-time operating system and controlling an accelerator circuit for an image or a voice;
  peripheral circuits;
 a first memory address space for the base band processing unit;
 a second memory address space for the application processing unit adapted to be independent of the first memory address space;
 a first bus coupled to the first CPU;
 a second bus coupled to the second CPU;
 a third bus coupled to the third CPU;
 a first bus bridge coupled between the first bus and the second bus;
 a second bus bridge coupled between the second bus and the third bus;
 wherein the first memory address space is assigned a first access window for accessing the second memory address space,
 wherein the second memory address space is assigned a second access window for accessing the first memory address space,
 wherein the first CPU is adapted to access an arbitrary address space of the second memory address space by accessing the first access window of the first memory address space,
 wherein the first CPU is adapted to access the peripheral circuits of the application processing unit by accessing the first access window of the first memory address space,
 wherein the first CPU is separated from the second CPU via the first bus bridge, and
 wherein the second CPU is separated from the third CPU via the second bus bridge.

9. The one chip semiconductor integrated circuit device according to claim 8, further comprising:
 a register to store an arbitrary value indicating address ranges of the first access window;
 a first cache memory included in the base band processing unit;
 a first MMU included in the base band processing unit;
 a second cache memory for the second CPU included in the application processing unit;
 a second MMU for the second CPU included in the application processing unit;
 a third cache memory for the third CPU included in the application processing unit; and
 a third MMU for the third CPU included in the application processing unit.

* * * * *